United States Patent [19]

Lane et al.

[11] 4,049,866

[45] Sept. 20, 1977

[54] BY-PRODUCT GYPSUM FILLERS FOR MICA-FREE JOINT COMPOUNDS

[75] Inventors: Marvin K. Lane, Chicago; Winton C. Anderson, Elk Grove Village, both of Ill.

[73] Assignee: United States Gypsum Company, Chicago, Ill.

[21] Appl. No.: 663,585

[22] Filed: Mar. 4, 1976

Related U.S. Application Data

[62] Division of Ser. No. 359,392, May 11, 1973, Pat. No. 3,975,320.

[51] Int. Cl.² .................. B32B 5/16; C04B 11/00; C04B 11/02
[52] U.S. Cl. .................. 428/402; 106/109; 106/110; 260/29.6 PS; 260/42.52; 423/161; 423/166; 423/555; 428/323; 428/539
[58] Field of Search .................. 428/323, 402, 539; 423/555, 161, 166; 260/8, 17 R, 42.52, 29.6 PS; 106/109, 110

[56] References Cited

U.S. PATENT DOCUMENTS

| 2,044,942 | 6/1936 | Heckert | 423/555 |
|---|---|---|---|
| 2,177,269 | 10/1939 | Sullivan | 423/555 |
| 3,262,799 | 7/1966 | McCleary | 423/555 |
| 3,328,121 | 6/1967 | Shull | 423/555 |
| 3,557,029 | 1/1971 | Bergeron | 260/8 |
| 3,840,638 | 10/1974 | Morita | 423/166 |
| 3,949,047 | 4/1976 | Cherdron | 423/166 |

*Primary Examiner*—Ellis Robinson
*Attorney, Agent, or Firm*—Samuel Kurlandsky; Robert H. Robinson; Glenn W. Ohlson

[57] ABSTRACT

A filler for a mica-free joint compound, comprising by-product gypsum having a mean particle size between about 11 and about 12 microns, a percentage by weight of particles smaller than 1 micron of between about 5 and about 6.5, and a packed dry bulk volume no greater than about 93 cc. per 100 grams.

4 Claims, 6 Drawing Figures

4,049,866

BY-PRODUCT GYPSUM FILLERS FOR MICA-FREE JOINT COMPOUNDS

This is a division of application Ser. No. 359,392, filed May 11, 1973, now U.S. Pat. No. 3,975,320.

BACKGROUND OF THE INVENTION

In the construction of buildings with so-called cry walls, it is conventional to apply a joint compound to the joints of wallboard panels to conceal the joints and present a monolithic surface. It has also been conventional to use either a setting type of compound or a drying type of compound, or both, depending upon construction conditions such as the rate at which the joint must be ready for further treatment or handling, atmospheric moisture conditions, and others. Setting types or compounds are characterized by a material, such as calcium sulfate hemihydrate, which combines with some of the water in the mix to convert the hemihydrate form into the dihydrate form. Drying is incidental and in some cases undesirable. An example of a setting type of compound is disclosed in U.S. Pat. No. 3,297,601. On the other hand, drying type compounds do not combine with the water, but rely on the evaporation of the water to give them strength. That is, instead of having a hemihydrate filler, calcium carbonate is often used. Such drying types usually incorporates a binder such as polyvinyl acetate, which, when dry, contributes the primary stress strength needed by the compound. An example of a drying type is disclosed in U.S. Pat. No. 3,342,761.

A recent development by the United States Gypsum Company featured the elimination of the expensive ingredient mica which heretofore was essential to prevent cracking due to shrinkage. The plate-like character of mica particles provides lateral reinforcement to the matrix so that it can withstand rather high dry-out shrinkage without cracking. The elimination of mica was accomplished by the use of as-mined calcium sulfate dihydrate known as landplaster, ground so as to have a particular particle size distribution as described and claimed in U.S. application Ser. No. 277,446 filed on Aug. 2, 1972, commonly owned with the instant application. That application was based upon the discovery that the landplaster in question did not cause cracking such as was common with mica-free fillers heretofore used.

In addition to calcium sulfate dihydrate mined from the ground, considerable amounts of so-called by-product gypsum are produced synthetically by various conventional chemical reactions or processes. In each of these cases, the by-product gypsum is either undesirable, due for example to the presence of impurities, or is of little value because it lacks a significant market. An example of an impure form of by-product gypsum is that produced by the phosphoric acid process. A different process known as the citric acid process produces, on the other hand, a gypsum the purity of which cannot be equaled by any other source of gypsum. It is further distinguished by crystals having a peculiar twinned structure, and a very high brightness also not achievable by any other source. Landplaster or terra alba, on the other hand, comprises particles each of which are aggregated crystals and are less bright, due in part to impurities.

SUMMARY OF THE INVENTION

The invention relates to a new synthetically produced filler and an improved drying-type joint compound made with the filler, which eliminates the need for mica due to its ability to prevent cracking upon drying from the wet condition. More specifically, there is provided a filler for a crackresistant, drying-type joint compound, comprising calcium sulfate dihydrate having a particle size distribution characterized by a mean particle size of between about 11 and about 12 microns, particles having a size smaller than 1 micron comprising between about 5 percent and about 6.5 percent by weight of the filler, and a packed dry bulk volume no greater than about 93 cc. per 100 grams. The drying type joint compound made from this filler is further characterized by a crack-less shrinkage, upon drying, of no greater than about 23 percent.

Accordingly, it is an object of the invention to provide a synthetically produced filter for a joint compound which can eliminate the need for mica without sacrificing crack resistance.

It is a related object of invention to provide a mica-free joint compound made from such a filler which is crackresistant.

Other objects and advantages will become apparent upon reference to the following brief description of the drawings and the following description of the preferred embodiments.

DESCRIPTION OF THE PREFERRED EMBODIMENTS

The disclosure relates to a filler which produces a crack-resistant, drying type joint compound which is essentially free of mica. More specifically, it has been discovered that a certain form of synthetically produced gypsum has crack resistance which obviates the need for including mica as a crack inhibitor. When added to a binder, and certain optional additives, excluding however mica, the result is a joint compound which may be ready-mixed with water to a paste-like consistency, or packaged or stored in powder form.

The synthetically produced gypsum filler of the invention differs from the landplaster described and claimed in the aforesaid copending application in physical properties, and not in chemical properties. Thus, although both are calcium sulfate dihydrate, only synthetically produced gypsum processed as described below has for the prescribed size distribution a packed dry bulk volume of no greater than about 93 cc. per 100 grams and a shrinkage no greater than about 23 percent, without causing cracking when used to make a mica-free joint compound. Further, only this gypsum synthetically produced from the citric acid process has the desirable characteristics of crystals with at least 98 percent purity and a 97 percent brightness.

The particle size distribution is believed to significantly effect a filler's ability to dry from a ready-mixed condition without shrinking, and still have sufficient workability to permit the compound to be troweled satisfactorily. Not surprisingly, it is estimated that the larger the packed dry bulk volume of the filler expressed as cubic centimeters per 100 grams of filler, the greater the likelihood of cracking the joint compound upon drying. This is based upon preliminary studies which have shown that the mean particle size and amount of particles smaller than 1 micron are crucial to the performance of the filler in the joint compound. More specifically, the larger the mean particle size, and the smaller the amount of ultra fines, the smaller is the dry packing bulk volume, and therefore the less the likelihood of cracking due to shrinking. However, good workability such as troweling appears to depend upon the existence of at least a minimum amount of particles below one micron. Tests have shown that the filler of the instant invention meets these somewhat conflicting requirements.

Therefore, as described below the by-product gypsum was processed so as to achieve the same relatively high mean particle size, namely about 12 microns, as is achieved by the invention set forth in the aforesaid application, and at the same time processed so as to raise the percentage amount of minus 1 micron particles above the maximum level heretofore thought to be desirable.

STARTING MATERIAL

EXAMPLE No. 1

Figure 1:
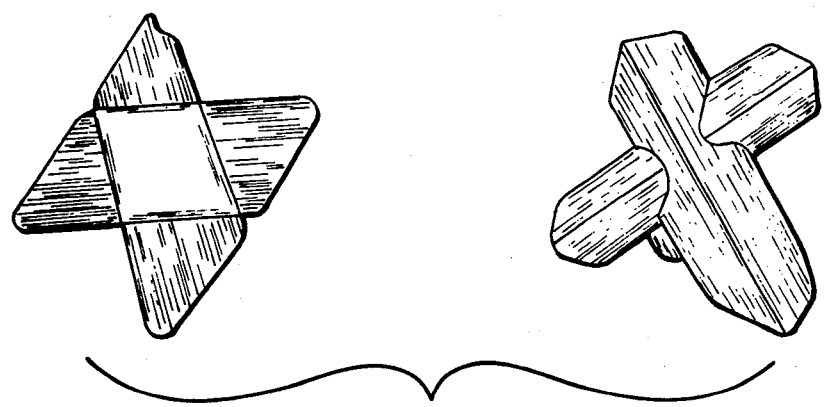
FIG. 1 is a reproduction of microphotographed synthetically produced calcium sulfate dihydrate prior to treatment in accordance with the invention to make a filler for use in joint compounds.

FIG. 1 illustrates one example of so-called by-product gypsum prepared by the citric acid process, before further treatment to achieve the desired particle size distribution. Specifically, the gypsum is the result of the conventional fermentation processing of citric acid from preferably beet sugar by the use of certain fungi strains, such as *A. niger*. As is well known, after the fermentation, the mycelia are filtered and the citrate is precipitated by the addition of lime. The resulting calcium citrate is converted to citric acid by the addition of sulfuric acid, which in turn results in by-product gypsum as a precipitate. The precipitate is washed and neutralized so as to raise the pH up to at least about 6.5.

Figure 2:
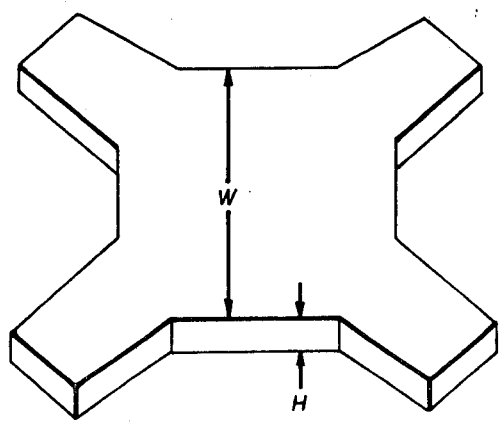
FIG. 2 is a perspective view of a somewhat stylized crystal of calcium sulfate dihydrate featured in the invention.

Under the microscope at greater than 300 power, the resulting gypsum sized at +325 mesh appears approximately as shown in FIG. 1. This particular by-product gypsum was obtained from Miles Laboratory. The larger particles are single, twinned crystals, and the gypsum has a purity and a brightness of at least 98 to 99 percent, respectively. The brightness was measured on a Beckman DU photometer with a reflective attachment, using magnesium carbonate as the standard. Significantly these crystals are generally plate-like in shape and thickness, with paired spikes projecting from the crystal body. The aspect ratio of the plates forming the crystals is on the average about 0.23. This was determined by comparing the height $h$ of the crystals, with the height of comparably sized landplaster known to have an aspect ratio of about 0.7. "Aspect ratio" is defined to be the ratio of height $h$ to the width $w$, measured for by-product gypsum as shown in FIG. 2. It was found that by-product gypsum has on the average about one-third the height, and therefore about one-third the aspect ratio of landplaster, or a ratio of about 0.23.

Figure 3:
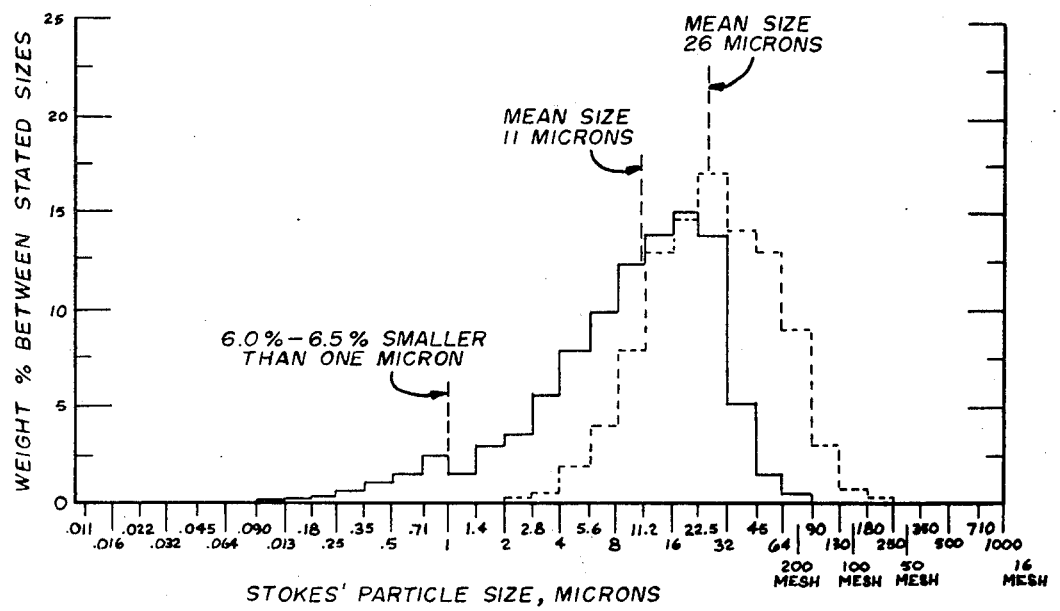
FIGS. 3 and 4 are histograms logarithmically illustrating the particle size distributions of fillers prepared in accordance with the invention.

Consistently, the largest of these by-product gypsum crystals seldom achieves a top size of 50 U.S. Standard mesh, or 297 microns. More specifically, FIG. 3 illustrates the particle size distribution of a representative sample, and specifically the sample shown in FIG. 1. The phantom curve represents the distribution prior to processing as described below. It is significant that the by-product gypsum produced by the citric acid process totally lacks crystals smaller than one micron. This is the main reason that the by-product gypsum must be further processed.

Further processing comprises grinding the dihydrate crystals in a conventional Alpine Contraplex pin mill until the particle size distribution shown by the solid line, FIG. 3, is achieved. The setting of the mill is such as to preferably produce 100% through 140 mesh (105 microns), 94% through 325 mesh (44 microns), and 58–60% through 625 mesh (20 microns) (U.S. Standard mesh sizes). During grinding, some partial calcination may occur in the very small particles. If it does, it is undesirable as it causes undesired stiffening in the joint compound and reduces bondability. To avoid this, the ground gypsum may be aerated either in transit or in storage, atmospheric moisture being sufficient to rehydrate such very small particles. Because of the high percentage of minus 1 micron particles thus created, namely about 6 to 6.5%, it was surmised that the grinding caused the spikes to break off. Microscopic inspection reveals that this is indeed the case, as very few spikes appear on the crystals after grinding. The Blaine surface area after the above grinding was 6,830 sq. cm. per gram.

Still further processing of the dihydrate is not necessary, unless scaling occurs in the grinding so as to produce +140 U.S. Standard mesh particles. In that event, the undesirable large grit may be removed in a conventional manner by passing the dihydrate through an air classifier.

EXAMPLE NO. 2

Figure 4:
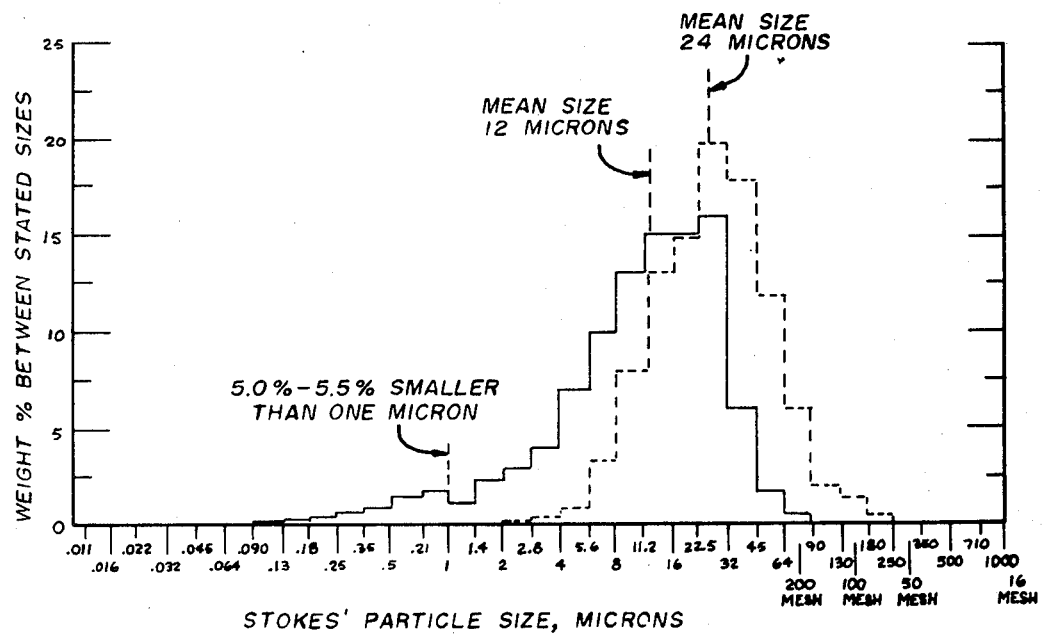

It might be supposed that a different particle size distribution may occur in the initial by-product gypsum, depending upon the processing conditions. Accordingly, a second batch of by-product gypsum was obtained from Miles Laboratory, derived in the same manner as described above, only on a different date. FIG. 4 is the histogram showing the particle size distribution of Example No. 2 before, in phantom, and after, in solid line, grinding in the Alpine Contraplex pin mill as described above. Again, an entire new set of minus 1 micron particles, on the order of between about 5 and 5.5% by weight, was produced by the grinding. The final Blaine surface area was about 5,900 sq. cm. per gram. On the whole, the final particle size distribution of Example No. 2 was quite similar to that of Example No. 1, as will be seen if the graphs are superimposed. Only a slight increase in mean particle size, and a slight decrease in percentage of minus 1 microns, was observed.

Substantially no difference in purity or brightness was observed in Example No. 2, compared to Example No. 1.

JOINT COMPOUND

Both Examples prepared in the above fashion were incorporated with other ingredients to make two ready-mixed joint compounds per the following mica-free formula.

Formula 1

| Ingredient | Weight Percent, Non-Volatile |
| --- | --- |
| Ground By-Product Gypsum Filler | 93.2 |
| Polyvinyl Acetate Emulsion Binder | 3.0 |
| Asbestos Shorts | 3.0 |
| Cellulosic Thickener | 0.8 |
| Preservatives | Less than 1 |
| Liquid Defoamer | Less than 1 |

In the above ingredients, the polyvinyl acetate emulsion was "Ucar 131" prepared by Union Carbide Corporation. This emulsion is internally plasticized with 10% dibutyl phthalate, and has 60% solids, a pH of 4 to 5, a weight of 9.2 pounds per gallon, a viscosity of 94 to 100 K.U., and a fineness of 100 particles maximum per 100 grams retained on a U.S. Standard 60 mesh sieve. For the remaining ingredients, a suitable cellulosic thickener which may be used is hydroxypropyl methyl cellulose, and the preservatives may be a mercurial preservative in combination with an organic non-metallic cyclic ether. Because the asbestos shorts, thickener, preservative, and defoamer are well known additives, for which a variety of brands are available, further description is unnecessary.

It will be readily appreciated that the foregoing formula is representative only, and in no way limiting. For example, the amount of by-product gypsum filler may be varied from about 80 to about 95%, the binder may vary from about 2 to about 10%, and the asbestos may be increased up to about 5%, all weights being on a total non-volatile basis. Furthermore, any other suitable binder may be used, such as modified starch in combination with either polyvinyl acetate or polyvinyl alcohol.

After water was added to the aforedescribed formulations, Example No. 1 was found to produce a ready-mixed paste having a consistency of about 53.3 cc. per 100 grams at a viscosity of 580 Brabenders, while Example No. 2 produced a consistency of about 56.5 cc. per 100 grams at 560 Brabenders. Viscosities were measured at 77° F. on a VC-3 Brabender, a commercially available viscometer equipped with a 250 centimeter-gram torsion head operated at a 75–78 r.p.m. spindle speed. This joint compound was typical of a topping grade.

The joint compounds so prepared were then tested for shrinkage and check-cracking, as well as for workability. As noted in the "Background" above, one primary problem in joint compounds lacking mica is their tendency to shrink to the point that the surface cracks. Shrinkage was measured as a percentage of volume shrinkage upon drying, measured under the conditions prescribed by ASTM C 474-67, Part 9. The joint compounds prepared from Examples 1 and 2 were found to shrink about the same (22.6% and 22.5%, respectively).

Figure 5:
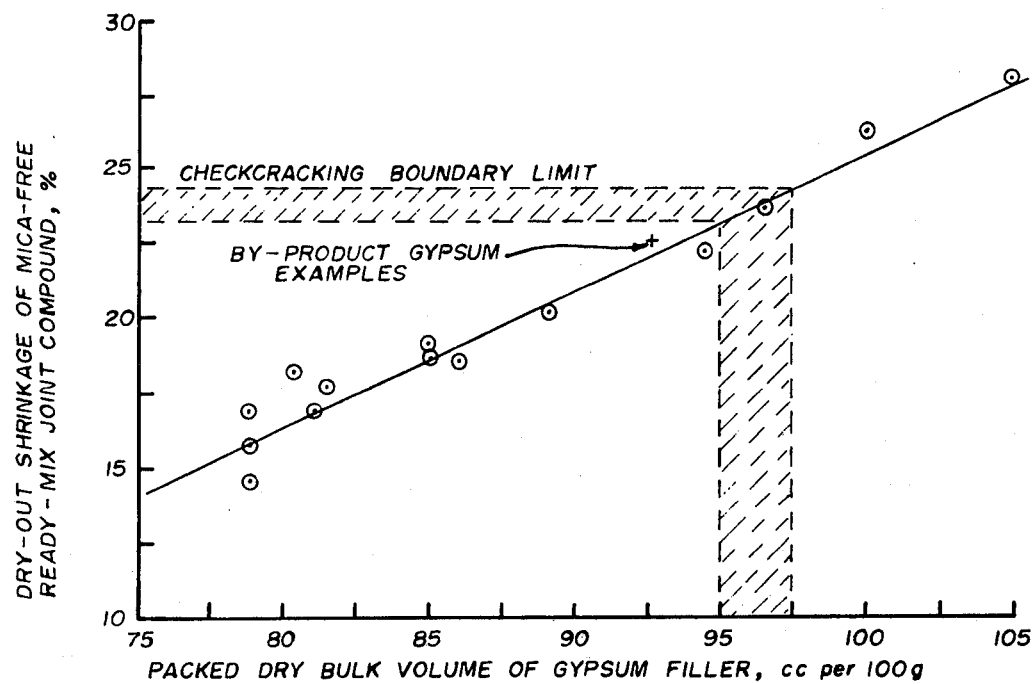
FIG. 5 is a graph illustrating the relationship between packed dry bulk volume and dry-out shrinkage.
Figure 6:
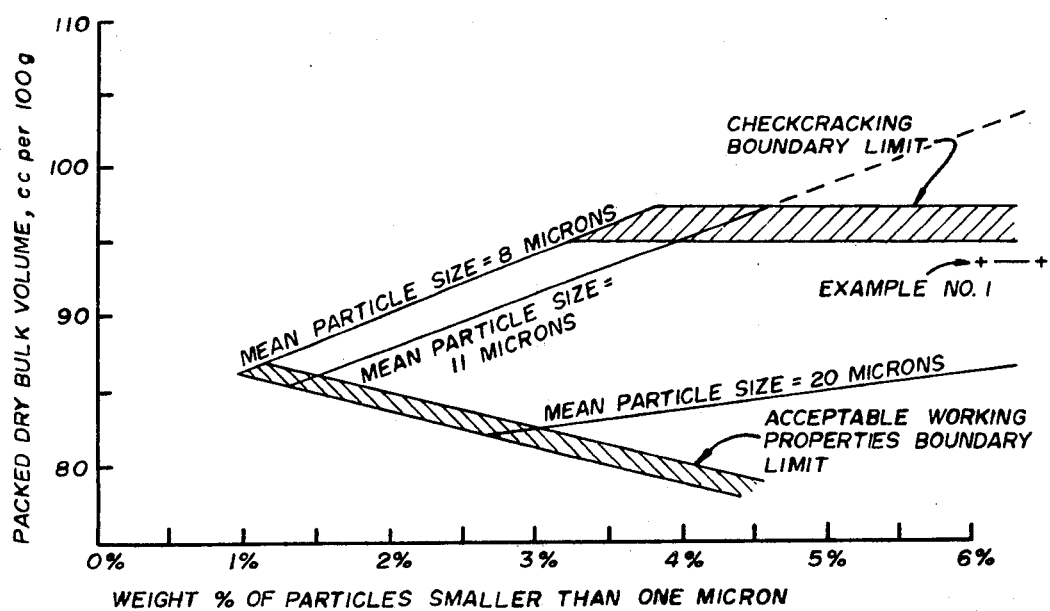
FIG. 6 is a graph illustrating the different packing behavior evidenced by the filler of the invention compared with landplaster filler.

FIG. 5 illustrates the relationship which has been found to exist for joint compounds prepared from natural, i.e., mined, dihydrate gypsum, or landplaster, filler of any kind. Thus, the abscissa represents varying packed dry bulk volume of the filler, achieved by varying the particle size distribution. The procedure for measuring this property is set forth below. The ordinate represents dry-out shrinkage, measured per ASTM C 474-67, of the joint compound prepared from the filler. The straight line is a least squares fit of the data points, other than the data for by-product gypsum, and represents the equation $S = 0.4611v - 20.4613$ with a 95% confidence limit for $S$ being 1.506; where $S$ is dry-out shrinkage and $v$ is packed dry bulk volume. FIGS. 5 and 6 further illustrate the boundary zones above which shrinkage and/or packed dry bulk volume may not go if cracking and check-cracking are to be avoided. FIG. 6 is described in greater detail below. It has been found that the check-cracking boundary may be exceeded slightly, in the case of by-product gypsum, due to the plate-like nature of the crystals, creating lateral reinforcement similar to the effect created by mica.

The packed dry bulk volume of Example No. 1 is about 92.5 cc. per gram. This along with its shrinkage of about 22.6%, when made into a joint compound, locates it along the standard curve in FIG. 5, indicating that by-product gypsum has the same relationship of shrinkage to packed dry bulk volume as does landplaster. Example No. 2 occupies essentially the same point.

Packed dry bulk volume was measured in all instances, by the following procedure.

Gypsum filler is brushed through a small 40-mesh sieve into a 20 cc. brass cylindrical container with a one-half inch internal diameter. When the cylinder is filled, a solid brass plunger machined to fit snugly, yet more freely, is inserted. The plunger is calibrated in 0.20 cc. divisions and weighs 199.4 grams. An external sleeve holds the plunger vertically in place in the cylinder. The entire unit is vibrated on an electrical dental-type vibrator causing the plunger to oscillate up and down, thereby packing the filler down into the cylinder. This vibrating action is continued until the plunger no longer moves downward. At this point, the filler will not pack any further. In order for the plunger to oscillate freely and easily, it has a small straight groove along its entire length to allow air to escape. A small circular piece of one-half inch filter paper is inserted between the plunger and gypsum filler to prevent powder from escaping through the groove during packing. The packed volume of the gypsum filler is determined by observing the distance in cc. from the top that the plunger has moved during the packing action and subtracting this from 20 cc. The weight of the packed powder is determined by weighing the cylinder before and after filling it with gypsum filler. Packed bulk volume is expressed in cc. per 100 grams.

The amount of shrinking of both Examples No. 1 and No. 2 was found to produce no cracking of any kind when both Examples were tested for this purpose. The cracking test comprises screeding a ⅛ inch thick coating, four inches across and eight inches wide, on pieces of wallboard, which are then stored horizontally in a 75° F., 10% relative humidity room for several hours. Drying is enhanced by repeatedly passing the samples under a fan positioned about 3 feet above the coatings. The dry coatings were inspected visually for cracks.

The ability of the joint compound to be manually troweled onto wallboard is known as "workability", and involves such features as slip and resistance to flow. Conventionally, this property is ascertained by the subjective testing of the compound in question by skilled applicators against known standard joint compounds. Both Examples No. 1 and No. 2 were found to have comparable workability and in some cases superior workability to that of conventional standard joint compounds.

It is possible to graphically illustrate the conflicting requirements of workability vs. crack-resistance. Thus, as shown in the aforesaid copending application, FIG. 6 illustrates the general behavior of landplaster filler at three mean particle sizes, as the percent of minus 1 micron particles changes. It also shows the boundaries of the maximum packed dry bulk volume for crack-free joint compound using landplaster, and the minimum packed dry bulk volume for acceptable workability. Of particular interest is the location of Example No. 1, as shown as a line, not a point, due to its range of minus 1 particles. It is the only data on this Figure that represents synthetic or by-product gypsum. Its position well below the location of the 11 micron mean particle size line for landplaster indicates that by-product gypsum filler is drastically different from landplaster in its packing characteristics and therefore its behavior in joint compound. Thus, if landplaster having an 11 micron mean particle size and 6 – 6.5% minus 1 microns were used in a mica-free joint compound, it would have a packed dry bulk volume of about 100, as shown by the dashed line, FIG. 6, and would therefore crack. It is postulated that the difference in behavior may be due to the smoother, flatter nature of the ground crystalline by-product gypsum, compared to the ragged nature of the landplaster filler.

A portion of the boundaries of FIG. 6 is determined by the line representing a mean particle size of 8 microns. The reason for this is that there is no practical way of making a gypsum filler having less than 8 microns mean particle size, with a percent of minus 1 micron particles between about 1 and about 3.5.

Thus the area of usable gypsum filler shown in FIG. 6 is defined by, on the left, the 8 micron mean line, at the top by a horizontal line at about 96 cc. per 100 gram packed dry bulk volume, and at the bottom, by a sloped line defined approximately by the equation:

$$P = -2.4w = 89$$

where $P$ = packed dry bulk volume, and $w$ = weight percent of minus 1 micron particles.

Other Embodiments

The filler of the invention can also be used to make a joint compound packaged and stored dry. The following formula is representative, water being added at the job site to achieve the desired consistency.

Formula No. 2

| Ingredient | Weight Percent |
|---|---|
| By-Product Gypsum Filler | 89.65 |
| Modified Starch Binder | 3.0 |
| Polyvinyl Alcohol Binder | 0.5 |
| Asbestos Shorts | 4.5 |
| Hydroxypropyl Methyl Cellulose | 0.5 |
| Titanium Dioxide Pigment | 1.0 |
| Preservatives | Less than 1 |
| Other Additives | Less than 1 |

The filler can be varied in amount as in Formula No. 1, and can be either Example No. 1, Example No. 2, or any byproduct gypsum having a similar histogram. The modified starch binder is not believed to be critical. A suitable one is "Staramic 620" made by A. E. Staley Manufacturing Company and having 12.0% magimum moisture content, 85% minimum water solubility (on a dry solids basis), 20 ppm maximum foreign matter, a screen analysis of 0.5% plus U.S. Standard 60 mesh, a viscosity of 410 cps measured on a 20% dry solids basis, and a 12 Garner color. Similarly, any polyvinyl alcohol may be used. A suitable example is "Gelvatol 20/60 BP" manufactured by Monsanto Chemical Co., having a dry powder form of which 100% is minus U.S. Standard 50 mesh and 99.7% is minus 60 mesh, a 4% aqueous solution at 20° C. having a Brookfield viscosity of 20 ± 5 cps, and a pH of 6 to 8. As to the preservatives, these are conventional, and may be selected from those such as zinc dimethyldithiocarbamate. The other additives, which are optional, include dispersing agents and insolubilizing agents such as glyoxal. As they are conventional and well known, no further discussion of these other additives is necessary.

Formula No. 2 when mixed with water and conventionally applied, will produce a crack-free finish substantially similar in appearance to that produced by the previously described ready-mixed formula.

Yet another embodiment which can be produced in accordance with the invention is a dry packaged joint compound similar to Formula No. 2, except that a spray-dried polyvinyl acetate binder is substituted for the polyvinyl alcohol. The amount of this binder must be increased so as to be present in an amount of at least 1%, bringing the combined starch and dry polyvinyl acetate binders up to at least 4%. Again, the particular polyvinyl acetate used is not believed to be critical, "Ucar 130" being a suitable example. Ucar 130 is the same as "Ucar 131", except the plasticizer is not incorporated into the polyvinyl acetate.

Thus, although the invention has been described in connection with certain preferred embodiments, it is not intended that it be limited thereto. Rather, it is intended that it cover all alternate compositions, equivalents, and embodiments as may be covered by the scope of the following claims.

What is claimed is:

1. A filler for a crack-resistant, drying type joint compound, consisting essentially of calcium sulfate dihydrate synthetically produced from the citric acid process and further processed to have a particle size distribution characterized by
   a mean particle size of between about 11 and about 12 microns,
   particles having a size smaller than one micron comprising between about 5% and about 6.5% by weight of the filler, and
   a packed dry bulk volume no greater than about 93 cc. per 100 grams.

2. The filler as defined in claim 1, wherein said calcium sulfate dihydrate comprises single crystals and has a purity of at least 98%.

3. The filler as defined in claim 2, wherein the average aspect ratio of the crystals is about 0.23.

4. The filler as defined in claim 1, wherein said calcium sulfate dihydrate is further characterized by a brightness of at least 97%.

* * * * *